(12) United States Patent
Faivre et al.

(10) Patent No.: US 10,119,242 B1
(45) Date of Patent: Nov. 6, 2018

(54) FRONT LOADER MOUNTING ARRANGEMENT FOR A WORK VEHICLE

(71) Applicant: Deere & Company, Moline, IL (US)

(72) Inventors: Damien Faivre, Apremont (FR); Paul Baulieu, Mannheim (DE); Jerome Bernard, Arc les Gray (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/937,092

(22) Filed: Mar. 27, 2018

(51) Int. Cl.
  *E02F 3/36* (2006.01)
  *E02F 3/627* (2006.01)
  *A01B 59/06* (2006.01)
  *E02F 3/38* (2006.01)

(52) U.S. Cl.
  CPC .......... *E02F 3/3695* (2013.01); *A01B 59/061* (2013.01); *A01B 59/064* (2013.01); *E02F 3/382* (2013.01); *E02F 3/6273* (2013.01)

(58) Field of Classification Search
  CPC ........ E02F 3/627; E02F 3/6273; E02F 3/3695
  See application file for complete search history.

(56) References Cited

U.S. PATENT DOCUMENTS

| | | | | |
|---|---|---|---|---|
| 3,805,980 A | * | 4/1974 | Kisaka | B62D 49/02 414/686 |
| 4,264,264 A | * | 4/1981 | McMillan | E02F 3/968 37/403 |
| 4,798,511 A | * | 1/1989 | Kaczmarczyk | E02F 3/36 414/686 |
| 6,986,634 B2 | * | 1/2006 | Westendorf | E02F 3/6273 172/273 |
| 7,172,384 B1 | * | 2/2007 | Westendorf | E02F 3/6273 172/274 |
| 7,549,832 B2 | * | 6/2009 | Mailleux | E02F 3/6273 172/274 |
| 7,632,056 B2 | * | 12/2009 | Nilsson | E02F 3/3645 37/468 |
| 9,226,438 B2 | * | 1/2016 | Faivre | A01B 59/064 |
| 9,226,439 B2 | | 1/2016 | Faivre et al. | |
| 9,267,263 B2 | * | 2/2016 | Bertrand | E02F 3/34 |
| 9,567,018 B1 | * | 2/2017 | Pigeon | B62D 49/065 |

(Continued)

FOREIGN PATENT DOCUMENTS

JP 2000170200 A * 6/2000 ............ E02F 3/6273

*Primary Examiner* — Gerald McClain
(74) *Attorney, Agent, or Firm* — Klintworth & Rozenblat IP LLP; Steven J. Wietrzny

(57) ABSTRACT

A mast coupling arrangement for mounting a front loader to a work vehicle at a mounting frame defining connection points and a load point includes a mounting bracket mounted at an end of a mast of the front loader, and a first mast connector removably coupling the mounting bracket and one of the connection points of the mounting frame when the front loader is attached. The mast coupling arrangement includes a load element mounted to the mast that, when the front loader is attached, is in load transferring contact with the load point of the mounting frame. The mast coupling arrangement includes a second mast connector removably coupling the mounting bracket and another of the connection points of the mounting frame when the front loader is attached to. The second mast connector and the associated connection point of the mounting frame are separable when the front loader is attached.

20 Claims, 8 Drawing Sheets

(56) References Cited

U.S. PATENT DOCUMENTS

2007/0292254 A1* 12/2007 Mailleux ............... E02F 3/6273
   414/686
2017/0247854 A1* 8/2017 Hyder .................. E02F 3/3695

* cited by examiner

FRONT LOADER MOUNTING ARRANGEMENT FOR A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and to a mounting arrangement for coupling a front loader to a work vehicle.

BACKGROUND OF THE DISCLOSURE

In the agriculture, construction and forestry industries, various work machines, such as front loaders, may be utilized in lifting and moving various materials. In certain examples, a front loader may include a bucket pivotally coupled by a loader arms to the vehicle chassis. One or more hydraulic cylinders move the loader arms and/or the bucket to move the bucket between positions relative to the chassis to lift and move materials.

Generally, the front loader is reversibly or removably coupled to the work vehicle, which enables other work implements to be used with the work vehicle. Due to the nature of the front loader, in certain instances, an operator must exit the work vehicle to initially attach the front loader to the work vehicle and must exit the work vehicle a second time to couple the one or more hydraulic cylinders of the loader arms to the work vehicle. The repeated trips of the operator from the work vehicle to the front loader increase a cycle time of the front loader, and reduce productivity. In addition, the repeated trips are inconvenient for the operator.

SUMMARY OF THE DISCLOSURE

The disclosure provides a front loader mounting arrangement for a work vehicle that enables the front loader to be coupled to the work vehicle by the operator in one trip from the work vehicle.

In one aspect, the disclosure provides a mast coupling arrangement for mounting a front loader to a work vehicle at a mounting frame defining connection points and a load point. The mast coupling arrangement includes a mounting bracket mounted at a proximal end of a mast of the front loader, and a first mast connector removably coupling the mounting bracket and one of the connection points of the mounting frame when the front loader is attached to the work vehicle. The mast coupling arrangement includes a load element mounted to the mast and, when the front loader is attached to the work vehicle, the mast load element is in load transferring contact with the load point of the mounting frame. The mast coupling arrangement includes a second mast connector removably coupling the mounting bracket and another of the connection points of the mounting frame when the front loader is attached to the work vehicle. The second mast connector and the associated connection point of the mounting frame are separable when the front loader is attached to the work vehicle.

Further provided is a work vehicle. The work vehicle includes a mounting frame having a load point and first and second connection points. The work vehicle includes a removable front loader having a mast, and a mast coupling arrangement. The mast coupling arrangement includes a mounting bracket mounted at a proximal end of the mast of the front loader, and a first mast connector removably coupling the mounting bracket and the first connection point of the mounting frame when the front loader is attached to the work vehicle. The mast coupling arrangement includes a load element mounted to the mast and, when the front loader is attached to the work vehicle, being in load transferring contact with the load point of the mounting frame. The mast coupling arrangement includes a second mast connector removably coupling the mounting bracket and the second connection point of the mounting frame when the front loader is attached to the work vehicle. The second mast connector and the second connection point of the mounting frame are separable when the front loader is attached to the work vehicle.

Also provided is a method for coupling a front loader having a mast to a work vehicle having a mounting frame. The mounting frame includes a first mounting frame connection point spaced apart from a second mounting frame connection point and a mounting frame load point between the first mounting frame connection point and the second mounting frame connection point. The method includes hooking the first mounting frame connection point on a first mast connector that extends from a mounting bracket mounted to the mast of the front loader, and rotating the mast such that a mast load element contacts the mounting frame load point to align an opening in the bracket with the second mounting frame connection point. The method includes inserting a removable second mast connector through the opening in the mounting bracket to engage the second mounting frame connection point of the mounting frame.

The details of one or more embodiments are set forth in the accompanying drawings and the description below. Other features and advantages will become apparent from the description, the drawings, and the claims.

BRIEF DESCRIPTION OF THE DRAWINGS

FIG. 2A is a top view of FIG. 2, which illustrates the front loader mounting arrangement associated with each side of the tractor and the front loader;

Like reference symbols in the various drawings indicate like elements.

DETAILED DESCRIPTION

The following describes one or more example embodiments of the disclosed front loader mounting arrangement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Conventional front loader mounting arrangements require operators to make multiple trips from the cab of the work vehicle to connect the front loader to the work vehicle, to connect a hydraulic system of the front loader to a hydraulic system of the tractor, to stow parking stands associated with the front loader, etc. Each trip the operator makes from the work vehicle to connect the front loader reduces cycle time and productivity of the work vehicle, and also reduces operator satisfaction.

This disclosure provides an alternative to the conventional front loader mounting arrangements by providing a front loader mounting arrangement that enables an operator to connect or disconnect the front loader in a single trip from the cab of the work vehicle. By being able to connect the front loader in a single trip, cycle time and productivity are increased, along with operator satisfaction. The disclosed front loader mounting arrangement is reversible or enables the front loader to be connected to the work vehicle and disconnected from the work vehicle multiple times.

In one example, the disclosed front loader mounting arrangement is associated with each side of the front loader and the work vehicle, such that there is a front loader mounting arrangement for a left side of the front loader and work vehicle, and there is a front loader mounting arrangement for the right side of the front loader and work vehicle. Each front loader mounting arrangement is the same. Each front loader mounting arrangement includes a mast associated with the front loader, a mounting frame associated with the work vehicle and a removable mast connection member. As used herein a "connection point" is a region or area defined on the mounting frame that is an attachment location for the mast of the front loader, and is not limited to a point in space or point contact. As used herein a "load point" is a region or area defined on the mounting frame that is a load transferring location for the mast of the front loader, and is not limited to a point in space or point contact.

Figure 1:
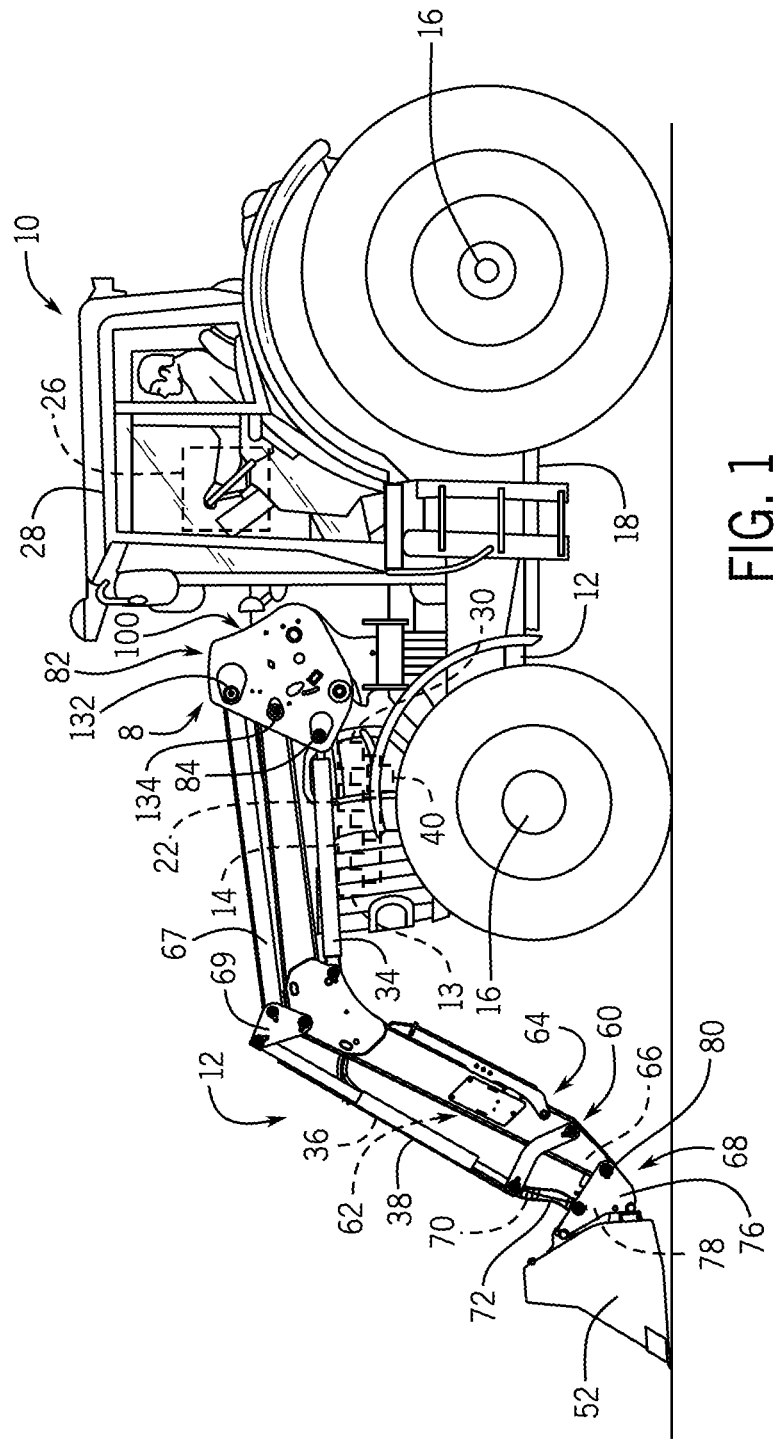
FIG. 1 is a side view of an example work vehicle in the form of an agricultural tractor in which the disclosed front loader mounting arrangement may be used to couple a front loader to the tractor, and the front loader is coupled to the tractor via the front loader mounting arrangement in FIG. 1.
Figure 2:
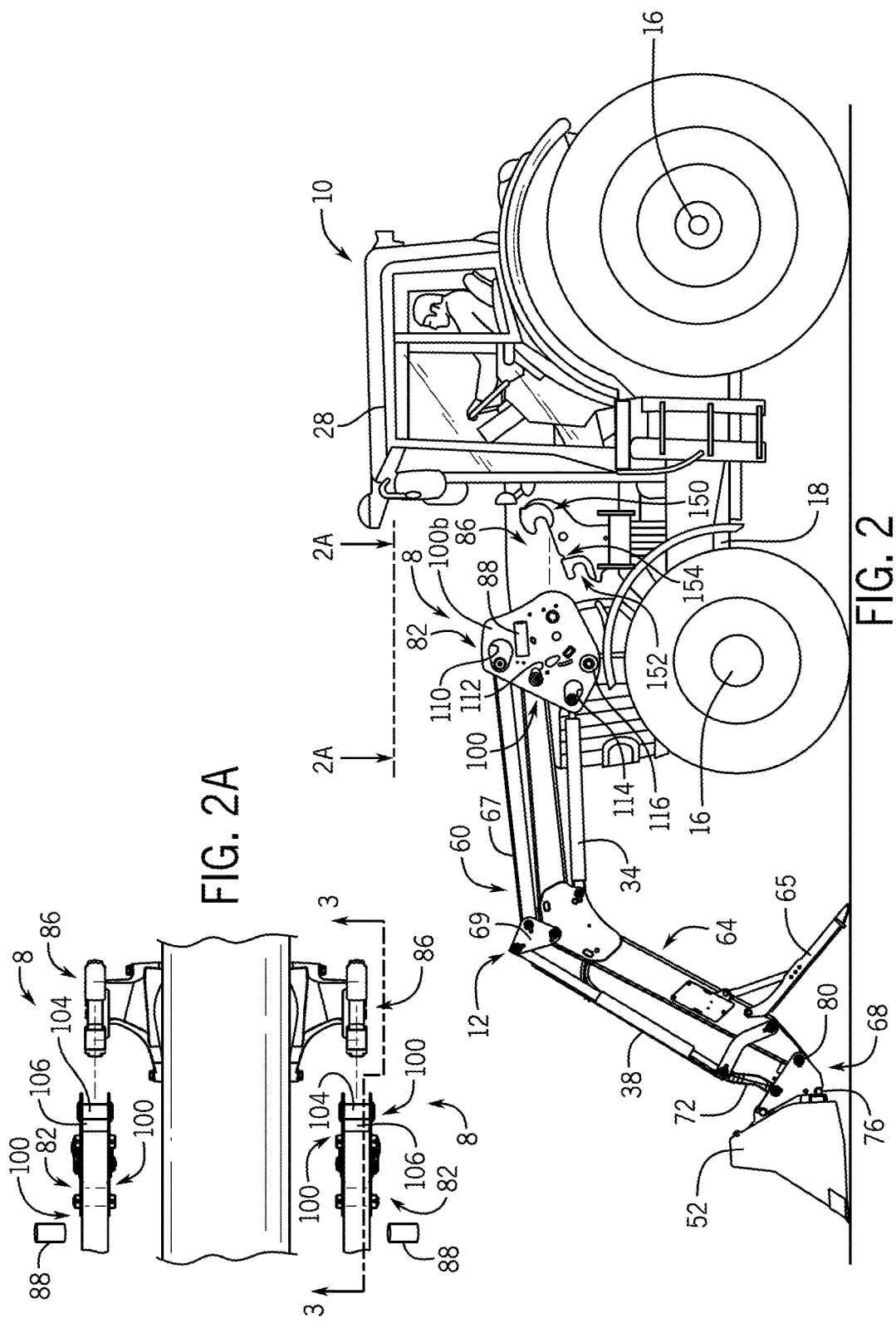
FIG. 2 is a side view of the tractor of FIG. 1, in which the front loader is uncoupled from the tractor.

The following describes an example front loader mounting arrangement for coupling a front loader to a work vehicle. The front loader mounting arrangement may be utilized with various machines or work vehicles, including tractors and other machines for lifting and moving various materials in the agricultural and construction industries. Referring to FIGS. 1 and 2, in some embodiments, a front loader mounting arrangement 8 may be used with a tractor 10 to couple a front loader 12 to the tractor 10. It will be understood that the implementation of the front loader mounting arrangement 8 with the tractor 10 is presented as an example only. In this regard, the disclosed front loader mounting arrangement 8 may be implemented with a front loader removably coupled to a work vehicle, such as a compact utility tractor. Other work vehicles, such as those used in the construction industry, may benefit from the disclosed front loader mounting arrangement 8 as well.

Generally, the tractor 10 includes a source of propulsion, such as an engine 13 that supplies power to a transmission 14. In one example, the engine 13 is an internal combustion engine, such as a diesel engine, that is controlled by an engine control module. The transmission 14 transfers power from the engine 13 to a suitable driveline coupled to one or more driven wheels 16 of the tractor 10 to enable the tractor 10 to move. The engine 13, the transmission 14 and the rest of the driveline are supported by a vehicle chassis 18, which is supported off the ground by the wheels 16. As is known to one skilled in the art, the transmission 14 can include a suitable gear transmission, which can be operated in a variety of ranges containing one or more gears, including, but not limited to a park range, a neutral range, a reverse range, a drive range, a low range, a high range, etc. The transmission 14 may be controlled by a transmission control module, which is, along with the engine control module, in communication with a master controller 22 (or group of controllers).

The controller 22 may control various aspects of the operation of the tractor 10 and may be configured as a computing device with associated processor devices and memory architectures, as a hard-wired computing circuit (or circuits), as a programmable circuit, as a hydraulic, electrical or electro-hydraulic controller, or otherwise. As such, the controller 22 may be configured to execute various computational and control functionality with respect to the tractor 10 (or other machinery). In some embodiments, the controller 22 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 22 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 22 may be in electronic, hydraulic, mechanical, or other communication with various other systems or devices of the tractor 10 (or other machinery), including the front loader 12. For example, the controller 22 may be in electronic or hydraulic communication with various actuators, sensors, and other devices within (or outside of) the tractor 10, including various devices associated with a hydraulic system and a hydraulic system of the front loader 12. The controller 22 may communicate with other systems or devices (including other controllers) in various known ways, including via a CAN bus (not shown) of the tractor 10, via wireless or hydraulic communication means, or otherwise. An example location for the controller 22 is depicted in FIG. 1. It will be understood, however, that other locations are possible including other locations on the tractor 10, or various remote locations. In some embodiments, the controller 22 may be configured to receive input commands and to interface with an operator via a human-machine interface 26, which may be disposed inside a cab 28 of the tractor 10 for easy access by the operator. The human-machine interface 26 is in communication with the controller 22 over a suitable communication architecture, such as a CAN bus. The human-machine interface 26 may be configured in a variety of ways and may include one or more joysticks, various switches or levers, a steering wheel, one or more buttons, a touchscreen interface that may be overlaid on a display, a keyboard, a speaker, a microphone associated with a speech recognition system, or various other human-machine interface devices.

The tractor 10 also has a hydraulic system that includes one or more pumps and accumulators (designated generally by reference number 30), which may be driven by the engine 13 of the tractor 10. Flow from the pumps 30 may be routed through various control valves and various conduits (e.g., flexible hoses) to drive various hydraulic cylinders, such as hydraulic cylinders 34, 36, 38 associated with the front loader 12, shown in FIG. 1. Flow from the pumps (and accumulators) 30 may also power various other components of the tractor 10. The flow from the pumps 30 may be controlled in various ways (e.g., through control of various electro-hydraulic control valves 40) to cause movement of the hydraulic cylinders 34, 36, 38, and thus, the front loader 12 relative to the tractor 10 when the front loader 12 is mounted on the tractor 10 through the front loader mounting arrangement 8. In this way, for example, movement of the front loader 12 between various positions relative to the chassis 18 of the tractor 10 may be implemented by various control signals to the pumps 30, control valves 40, and so on.

In the embodiment depicted, the front loader 12 includes a bucket 52 pivotally mounted to a boom assembly 60. The bucket 52 may comprise a conventional steel bucket. The boom assembly 60 includes a first loader arm 62 (on an opposite side of the front loader 12) and a second loader arm 64, which are interconnected via a cross-beam 66 to operate in parallel. The loader arms 62, 64 are each configured to be coupled to the chassis 18 via a mast 82 of the front loader mounting arrangement 8, at one end, and are coupled at an opposite end to the bucket 52 via a carrier 68, which is pivoted via first and second (left and right) pivot linkages 70, 72. In the illustrated example, the carrier 68 comprises first and second (left and right) couplers 74, 76, connected by a cross-rod 78, that mount to the distal ends of the respective loader arms 62, 64 via coupling pins 80. Additional pins pivotally couple the pivot linkages 70, 72 between the loader arms 62, 64 and the respective first and second couplers 74, 76. The pivot linkages 70, 72 enable pivotal movement of the bucket 52 upon actuation of the hydraulic cylinders 36, 38. The loader arms 62, 64 also include a respective parking stand 65, which supports the respective loader arm 62, 64 when the front loader 12 is uncoupled or unattached from the tractor 10 (FIG. 2). In certain embodiments, the loader arms 62, 64 also include a respective reinforcing arm 67, which is coupled between the mast 82 and a linkage 69. The reinforcing arms 67 are coupled to the linkage 69 and provide support for the movement of one or more hydraulic cylinders 36, 38.

The hydraulic cylinders 34 may be actuated to raise and lower the boom assembly 60 relative to the tractor 10. In the illustrated example, the boom assembly 60 includes two hydraulic cylinders, namely the hydraulic cylinder 34 coupled between a mast 82 of the front loader 12 and the second loader arm 64 and a corresponding cylinder on the opposite side of the loader (not shown) coupled between the mast 82 and the first loader arm 62. It should be noted that the tractor 10 may have any number of hydraulic cylinders, such as one, three, etc. Each of the hydraulic cylinders 34 includes an end coupled to the mast 82 (e.g., via a coupling pin 84) and an end mounted to the respective one of the first loader arm 62 and the second loader arm 64 (e.g., via another pin). Upon activation of the hydraulic cylinders 34, the boom assembly 60 may be moved between various positions to elevate the boom assembly 60, and thus the bucket 52, relative to the chassis 18 of the tractor 10.

The one or more hydraulic cylinders 36 are mounted to the first loader arm 62 and the first pivot linkage 70, and the one or more hydraulic cylinders 38 are mounted to the second loader arm 64 and the second pivot linkage 72. In the illustrated example, the front loader 12 includes a single hydraulic cylinder 36, 38 associated with a respective one of the first loader arm 62 and the second loader arm 64, respectively. Each of the hydraulic cylinders 36, 38 includes an end mounted to the linkage 69 (via another pin) of a respective one of the first loader arm 62 and the second loader arm 64 and an end mounted to the respective one of the first pivot linkage 70 and the second pivot linkage 72 (via another pin). Upon activation of the hydraulic cylinders 36, 38, the bucket 52 may be moved between various positions, namely to pivot the carrier 68, and thereby the bucket 52, relative to the boom assembly 60.

Thus, in the embodiment depicted, the bucket 52 is pivotable about the carrier 68 of the boom assembly 60 by the hydraulic cylinders 36, 38. As noted, in some embodiments, a different number or configuration of hydraulic cylinders or other actuators may be used. Accordingly, it will be understood that the configuration of the hydraulic system and the boom assembly 60 is presented as an example only. In this regard, in other contexts, a hoist boom (e.g. the boom assembly 60) may be generally viewed as a boom that is pivotally attached to a vehicle frame (via the front loader mounting arrangement 8), and that is also pivotally attached to an end effector (e.g., the bucket 52). Similarly, the carrier 68 (e.g., the couplers 74, 76) may be generally viewed as a component effecting pivotal attachment of a bucket (e.g. the bucket 52) to a vehicle frame. In this light, a tilt actuator (e.g., the hydraulic cylinders 36, 38) may be generally viewed as an actuator for pivoting a receptacle with respect to a hoist boom, and the hoist actuator (e.g. the hydraulic cylinders 34) may be generally viewed as an actuator for pivoting a hoist boom with respect to a vehicle frame.

In certain applications, sensors (e.g., pressure, flow or other sensors) may be provided to observe various conditions associated with the tractor 10. For example, the sensors may include one or more pressure sensors that observe a pressure within the hydraulic circuit, such as a pressure associated with at least one of the pumps 30, the control valves 40 and/or one or more hydraulic cylinders 34, 36, 38 to observe a pressure within the hydraulic cylinders and generate sensor signals based thereon. In some cases, various sensors may be disposed on or near the carrier 68 and/or the bucket 52. For example, sensors (e.g. inertial measurement sensors) may be coupled on or near the bucket 52 to observe or measure parameters including the acceleration of the boom assembly 60 and/or the bucket 52 and generate sensor signals, which may indicate if the boom assembly 60 and/or the bucket 52 is accelerating or decelerating. In some embodiments, various sensors (e.g., angular position sensors) may be configured to detect the angular orientation of the bucket 52 relative to the boom assembly 60, or to detect the angular orientation of the boom assembly 60 relative to the chassis 18, and various other indicators of the current orientation or position of the bucket 52. For example, rotary angular position sensors may be used or linear position or displacement sensors may be used to determine the length of the hydraulic cylinders 34, 36, 38 relative to the boom assembly 60.

The bucket 52 generally defines a receptacle for carrying various materials, such as dirt, rocks, wet dirt, sand, hay, etc. The bucket 52 is movable upon actuation of the hydraulic cylinders 36, 38 between a level position, a roll-back position and a dump position, along with various positions in between. In the level position, the bucket 52 can receive various materials. In the roll-back position, the bucket 52 is pivoted upward relative to the earth's surface or ground by the actuation of the hydraulic cylinders 36, 38 such that the bucket 52 may be loaded with and retain the various materials. In the dump position, the bucket 52 is pivoted downward relative to the earth's surface or ground by the actuation of the hydraulic cylinders 36, 38 such that the various materials may fall from the bucket 52 to substantially empty the bucket 52.

The front loader mounting arrangement 8 reversibly or removably couples the front loader 12 to the tractor 10. Generally, with reference to FIG. 2A, the front loader 12 and the tractor 10 include two front loader mounting arrangements 8, one for each side (e.g. left side, right side) of the front loader 12 and tractor 10. As the front loader mounting arrangement 8 on the left side of the tractor 10 is the same as the front loader mounting arrangement 8 on the right side of the tractor 10, the front loader mounting arrangement 8 on the right side will be discussed in detail herein, with the understanding that the front loader mounting arrangement 8 on the left side is the same.

Figure 3:
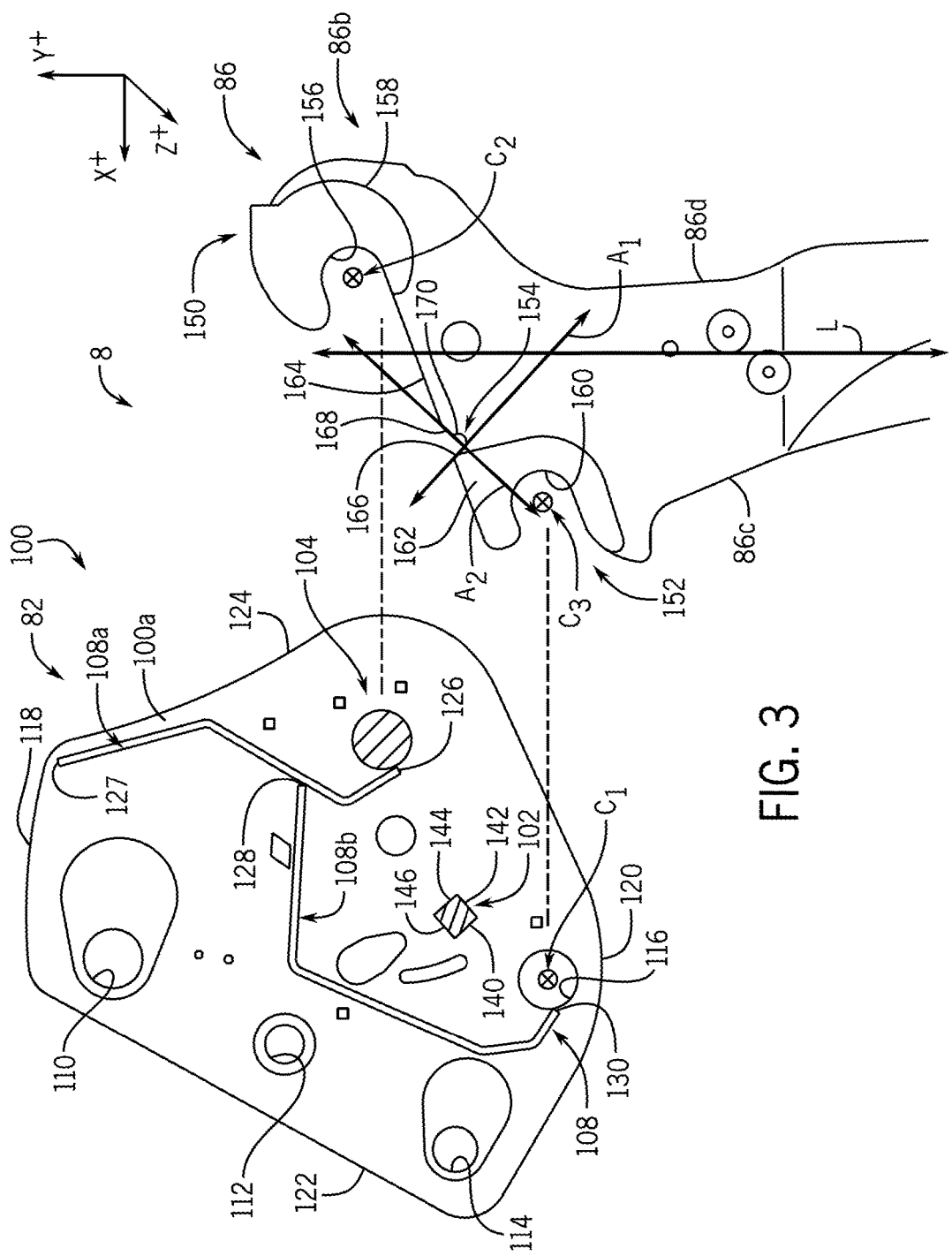
FIG. 3 is a cross-sectional detail view of the front loader mounting arrangement, taken along line 3-3 of FIG. 2A, in which a mounting frame of a right side of the tractor is spaced a distance apart from and uncoupled from a mast of a right side of the front loader.

In one example, each front loader mounting arrangement 8 includes the mast 82 of the front loader 12, a mounting frame 86 coupled to the chassis 18 (FIG. 2) and a removable second mast connector or second mast connection member 88. With reference also to FIGS. 2A and 3, the mast 82 includes a pair of mounting brackets 100 (FIG. 2A), a load element or mast load element 102 (FIG. 3) and a first mast connector or first mast connection member 104 (FIG. 3). The pair of mounting brackets 100 are mounted at a proximal end of the mast 82 of the front loader 12. FIGS. 3 to 8 illustrate a respective combination of the mast 82 and mounting frame 86 at the right side of the front loader 12 and the tractor 10 in a detail view in a plurality of cross-sectional views to illustrate the coupling of the front loader 12 to the tractor 10 with the front loader mounting arrangement 8.

With reference to FIG. 2A, the pair of mounting brackets 100 cooperate to define a channel 106 that is configured to receive the mounting frame 86. Generally, each of the mounting brackets 100 are spaced apart from each other such that the channel 106 is defined between the pair of mounting brackets 100 and the mounting frame 86 may be received between the pair of mounting brackets 100. The mounting brackets 100 are composed of a metal or metal alloy, and are stamped, cast, forged, etc. With reference also to FIG. 3, each of the mounting brackets 100 includes at least one reinforcement rib 108, a first pin coupling bore 110, a second pin coupling bore 112, a third pin coupling bore 114 and a connection bore 116. Each of the mounting brackets 100 also has a first end 118 opposite a second end 120, and a first side 122 opposite a second side 124. The mounting brackets 100 also include an interior surface 100a (FIG. 3) opposite an exterior surface 100b (FIG. 2). As the mounting brackets 100 are a mirror image of each other, one of the mounting brackets 100 will be described in detail herein, with the understanding that the other mounting bracket 100 is substantially the same.

In one example, the at least one reinforcing rib 108 includes two reinforcing ribs 108a, 108b. The reinforcing ribs 108a, 108b strengthen the mounting bracket 100 to inhibit bending, for example. The reinforcing ribs 108a, 108b are composed of a metal or metal alloy, and are stamped, cast, forged, etc. The reinforcing ribs 108a, 108b are welded to the interior surface 100a of the mounting bracket 100. In one example, the reinforcing rib 108a extends along the first side 124 proximate the first end 118 to be adjacent to or in contact with the first mast connection member 104. In this example, the reinforcing rib 108a has an end 126 in contact with the first mast connection member 104 to provide rigidity to the first mast connection member 104, and has an opposite end 127 proximate the first end 118. The reinforcing rib 108b extends outwardly from the reinforcing rib 108a and forms a substantially C-shape to be proximate the connection bore 116. In this example, the reinforcing rib 108b has a first rib end 128 proximate or in contact with the reinforcing rib 108a and an opposite second rib end 130 proximate the connection bore 116. By being positioned proximate the connection bore 116, the second rib end 130 may also assist in guiding the second mast connection member 88 through the connection bore 116.

The first pin coupling bore 110 is defined through the mounting bracket 100 adjacent to or near the first end 118, and so as to be adjacent to or near the first side 122. The first pin coupling bore 110 receives a pin 132 (FIG. 1) to couple the reinforcing arm 67 (FIG. 1) to the mounting brackets 100. The second pin coupling bore 112 is defined through the mounting bracket 100 so as to be between the first pin coupling bore 110 and the third pin coupling bore 114, and so as to be adjacent to or near the first side 122. The second pin coupling bore 112 receives a pin 134 (FIG. 1) to couple the end of the loader arm 64 (FIG. 1) to the mounting brackets 100. The third pin coupling bore 114 is defined through the mounting bracket 100 adjacent to or near the second end 120, so as to be adjacent to or near the first side 122. The third pin coupling bore 114 receives the coupling pin 84 (FIG. 1) to couple the end of the hydraulic cylinder 34 (FIG. 1) to the mounting brackets 100.

The connection bore 116 is defined through the mounting bracket 100 proximate the second end 120. The connection bore 116 is circular, and is sized to slidably receive the second mast connection member 88 therethrough. It should be noted, however, that the connection bore 116 may have any desired shape that corresponds with the second mast connection member 88, such as square, rectangular, oval, etc., and thus, the circular shape is merely an example. The connection bore 116 has a central axis C1. Each of the first pin coupling bore 110, the second pin coupling bore 112, the third pin coupling bore 114 and the connection bore 116 may be defined in the mounting bracket 100 by stamping, machining, etc.

The mast load element 102 is fixedly coupled between each of the mounting brackets 100. The mast load element 102 transfers force from the front loader 12 to the tractor 10 when the front loader 12 is coupled to the tractor 10 via the front loader mounting arrangement 8. The mast load element 102 is mounted to the mast 82, and when the front loader 12 is attached to the tractor 10 (FIG. 1), is in load transferring contact with a load point on the mounting frame 86. The mast load element 102 is composed of a metal or metal alloy, and is extruded, stamped, cast, forged, etc. The mast load element 102 has opposed ends, and each end of the mast load element 102 is coupled to a respective one of the mounting brackets 100, via welding, for example. In one example, the mast load element 102 is shaped as a rectangular post, and has a first side 140 that is at an angle to a second side 142, and a third side 144 that is at an angle to a fourth side 146. Thus, the mast load element 102 is a multi-sided bar. The first side 140 is opposite the third side 144, and the second side 142 is opposite the fourth side 146. The first side 140 is generally at about a 90 degree angle to the second side 142; however, the first side 140 may be at any desired angle relative to the second side 142. In addition, the third side 144 is generally at about a 90 degree angle to the fourth side 146; however, the third side 144 may be at any desired angle relative to the fourth side 146. Further, it should be noted that the mast load element 102 may have any desired shape that corresponds with the mounting frame 86, and need not have the third side 144 at an angle to the fourth side 146. In this example, as will be discussed, the first side 140 contacts a first portion of the mounting frame 86 in surface contact, and the second side 142 contacts a second portion of the mounting frame 86 in surface contact. The contact between the first side 140 and the second side 142 provides a clearance between the mounting frame 86 and the connection bore 116 of the mounting brackets 100, which enables the second mast connection member 88 to be received through the connection bore 116 of the mounting brackets 100. The contact between the first side 140 and the second side 142 of the mast load element 102 and the mounting frame 86 inhibits the motion of the front loader 12 relative to the tractor 10 in two translational degrees of freedom. In this example, the mast load element 102 cooperates with the mounting frame 86 to inhibit motion of the mast 82 in a positive X-direction and a negative Y-direction in a vehicle coordinate system.

The first mast connection member 104 is fixedly coupled between each of the mounting brackets 100. The first mast connection member 104 cooperates with the mounting frame 86 to rotate the mast 82 for the coupling of the mast 82 to the mounting frame 86. The first mast connection member 104 removably couples the mounting bracket 100 to a connection point on the mounting frame 86 when the front loader 12 is attached to the tractor 10 (FIG. 1). The first mast connection member 104 is composed of a metal or metal alloy, and is extruded, stamped, cast, forged, etc. The first mast connection member 104 has opposed ends, and each end of the first mast connection member 104 is coupled to a respective one of the mounting brackets 100, via welding, for example. In one example, the first mast connection member 104 is shaped as a cylindrical pin. It should be noted, however, that the first mast connection member 104 may have any desired shape that corresponds with the mounting frame 86, and need not be cylindrical. As will be discussed, the first mast connection member 104 is received within a portion of the mounting frame 86 to hook the front loader 12 onto the portion of the mounting frame 86. In this example, the first mast connection member 104 cooperates with the mounting frame 86 to inhibit translation of the mast 82 in a negative X-direction, a positive Y-direction and a Z-direction, and the rotation of the mast 82 about the X-axis and the Y-axis in the vehicle coordinate system.

The mounting frame 86 cooperates with the mast 82 to couple the front loader 12 to the tractor 10. The mounting frame 86 is composed of a metal or metal alloy, and may be cast, forged, stamped, extruded, etc. The mounting frame 86 has a first frame end 86a that is fixedly coupled to the chassis 18 of the tractor 10 (FIG. 1), via welding, for example. Alternatively, the first frame end 86a may be integrally formed with the chassis 18. The mounting frame 86 has a second frame end 86b opposite the first frame end 86a. The second frame end 86b is received in the channel 106 defined between the mounting brackets 100 (FIG. 2A). The mounting frame 86 also has a first side 86c and an opposite second side 86d. In one example, the second frame end 86b of the mounting frame 86 includes a first mounting frame connection point 150, a second mounting frame connection point 152 and a mounting frame load point 154 for coupling the mast 82 to the mounting frame 86.

The first mounting frame connection point 150 is spaced a distance apart from the second mounting frame connection point 152 along the second frame end 86b. In this example, the first mounting frame connection point 150 is defined at the second side 86d of the mounting frame 86. In one example, the first mounting frame connection point 150 is a hook, which defines a concave recess 156. The concave recess 156 has a central axis C2. The first mounting frame connection point 150 may be formed with a pair of substantially C-shaped reinforcements 158, which may be coupled to opposed sides of the mounting frame 86 at the first mounting frame connection point 150. The pair of reinforcements 158 may be composed of metal or metal alloy, and may be integrally formed with the mounting frame 86. In other embodiments, the pair of reinforcements 158 may be fixedly coupled to the mounting frame 86 at the first mounting frame connection point 150 via welding, for example. The pair of reinforcements 158 provide strength to the first mounting frame connection point 150.

The second mounting frame connection point 152 is defined at the first side 86c of the mounting frame 86. In one example, the second mounting frame connection point 152 is a second hook, which defines a second concave recess 160. Thus, the first mounting frame connection point 150 and the second mounting frame connection point 152 are respective first and second open-sided recesses that are each sized to receive the respective first mast connection member 104 and the second mast connection member 88. The second concave recess 160 has a central axis C3, which is configured to be coaxially aligned with the central axis C1 of the connection bore 116 to receive the second mast connection member 88 through the second mounting frame connection point 152. The second mounting frame connection point 152 may be formed with a second pair of substantially C-shaped reinforcements 162, which may be coupled to opposed sides of the mounting frame 86 at the second mounting frame connection point 152. The second pair of reinforcements 162 may be composed of metal or metal alloy, and may be integrally formed with the mounting frame 86. In other embodiments, the second pair of reinforcements 162 may be fixedly coupled to the mounting frame 86 at the second mounting frame connection point 152 via welding, for example. The second pair of reinforcements 162 provide strength to the second mounting frame connection point 152.

The mounting frame load point 154 is defined on an interface surface 164 that extends between the first mounting frame connection point 150 and the second mounting frame connection point 152 at the second frame end 86b. In one example, the mounting frame load point 154 is a multi-sided notch, which is defined into the interface surface 164 proximate the second pair of reinforcements 162. In this example, the mounting frame load point 154 includes a first surface 166, a second surface 168 and a relief 170. The first surface 166 is at an angle to the second surface 168. The first surface 166 is defined proximate the second pair of reinforcements 162 and extends along an axis A1. The axis A1 is oblique to or intersects a longitudinal axis L of the mounting frame 86. The second surface 168 is spaced apart from the first surface 166 by the relief 170. The second surface 168 extends along an axis A2, which is oblique to or intersects the axis A1 and the longitudinal axis L. The relief 170 is substantially concave, and connects the first surface 166 to the second surface 168. The relief 170 is sized such that a portion of the mast load element 102 is received within the relief 170 when the first side 140 of the mast load element 102 contacts the first surface 166 in surface contact and the second side 142 of the mast load element 102 contacts the second surface 168 in surface contact.

The removable second mast connection member 88 is received through the connection bore 116 of each of the mounting brackets 100 and couples the second mounting frame connection point 152 to the mast 82. The second mast connection member 88 is composed of a metal or metal alloy, and is extruded, stamped, cast, forged, etc. In one example, the second mast connection member 88 is a cylindrical pin, which is insertable through the connection bore 116 when the second concave recess 160 of the second mounting frame connection point 152 is coaxially aligned with the connection bore 116 of each of the mounting brackets 100. The second mast connection member 88 removably couples the mounting bracket 100 to another connection point on the mounting frame 86 when the front loader 12 is attached to the tractor 10 (FIG. 1), and the second mast connection member 88 and the associated connection point of the mounting frame 86 are separable when the front loader 12 is attached to the tractor 10. The second mast connection member 88 is removably connected to the mounting brackets 100, while the first mast connection member 104 is fixed to the mounting brackets 100. It should be noted, however, that the second mast connection member 88 may have any desired shape that corresponds with the mounting frame 86, and need not be cylindrical. The second mast connection member 88 has opposed ends, and each end of the second mast connection member 88 is received within a respective connection bore 116 of the mounting brackets 100. A portion of the second mast connection member 88 that extends between the opposed ends is received within the second concave recess 160 of the second mounting frame connection point 152. In this example, the second mast connection member 88 cooperates with the mounting frame 86 to inhibit rotation of the mast 82 about the Z-axis in the vehicle coordinate system.

Although not shown in detail herein, the second mast connection member 88 may include a wire or other connector at one of the opposed ends, which may be secured to a portion of one of the mounting brackets 100 to secure the second mast connection member 88 with the front loader 12 when the front loader 12 is uncoupled from the tractor 10 (FIG. 1). Further, one of the mounting brackets 100 may include a recess, flange or other coupling feature that retains the second mast connection member 88 when the second mast connection member 88 is not being used to couple the front loader 12 to the tractor 10 (FIG. 1).

Generally, in one example, with the mounting brackets 100 formed with the first pin coupling bore 110, the second pin coupling bore 112, the third pin coupling bore 114 and the connection bore 116, the reinforcing ribs 108a, 108b are coupled to each of the mounting brackets 100. One of the opposed ends of the mast load element 102 is coupled to one of the mounting brackets 100, and one of the opposed ends of the first mast connection member 104 is coupled to the one of the mounting brackets 100. The other opposed end of the mast load element 102 is coupled to the other of the mounting brackets 100, and the other opposed end of the first mast connection member 104 is coupled to the other of the mounting brackets 100 such that the mounting brackets 100 are coupled together to define the channel 106 (FIG. 2A). This is repeated to form both masts 82 for the front loader 12.

With the masts 82 formed and the remainder of the front loader 12 assembled, with reference to FIG. 1, in one example, the masts 82 are coupled to the respective one of the loader arms 62, 64 via a respective one of the pins 134. Each one of the pins 134 is inserted into the second pin coupling bore 112 of the pair of mounting brackets 100 and the end of the respective one of the loader arms 62, 64. Each of the reinforcing arms 67 is coupled to each one of the masts 82 via a respective one of the pins 132. Each one of the pins 132 is inserted into the first pin coupling bore 110 of the pair of mounting brackets 100 and the end of the respective one of the reinforcing arms 67. Each of the hydraulic cylinders 34 is coupled to a respective one of the mounting brackets 100 via the coupling pin 84. Generally, each one of the coupling pins 84 is inserted into the third pin coupling bore 114 of the mounting brackets 100 and the end of the respective one of the hydraulic cylinders 34.

With the masts 82 coupled to the front loader 12, the front loader 12 may be coupled to the tractor 10. With reference to FIG. 2, with the front loader 12 resting on the parking stands 65, the tractor 10 is advanced toward the front loader 12. With reference to FIG. 3, the tractor 10 is advanced such that the mounting frame 86 is in proximity to the mast 82.

Figure 4:
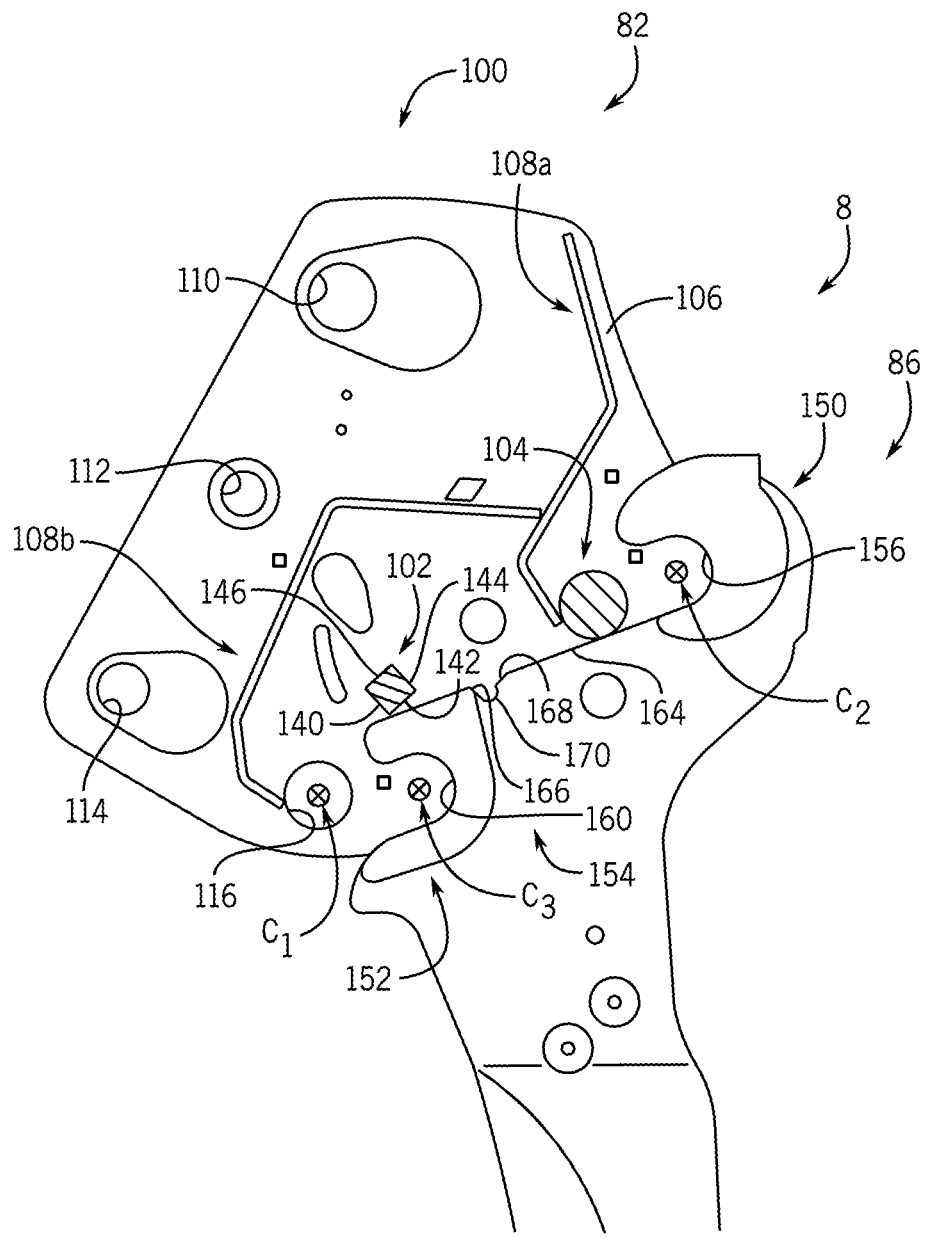
FIG. 4 is a cross-sectional detail view of the front loader mounting arrangement, taken along the perspective of line 3-3 of FIG. 2A, in which the tractor has been advanced toward the front loader such that the mounting frame of the right side of the tractor is positioned in a recess defined by the mast of the right side of the front loader.

With reference to FIG. 4, as the tractor 10 is advanced toward the front loader 12, the mounting frame 86 enters into the channel 106 defined between the mounting brackets 100. In one example, the interface surface 164 of the mounting frame 86 contacts the first mast connection member 104, which slides along the interface surface 164 as the tractor 10 advances toward the front loader 12 (FIG. 2).

Figure 5:
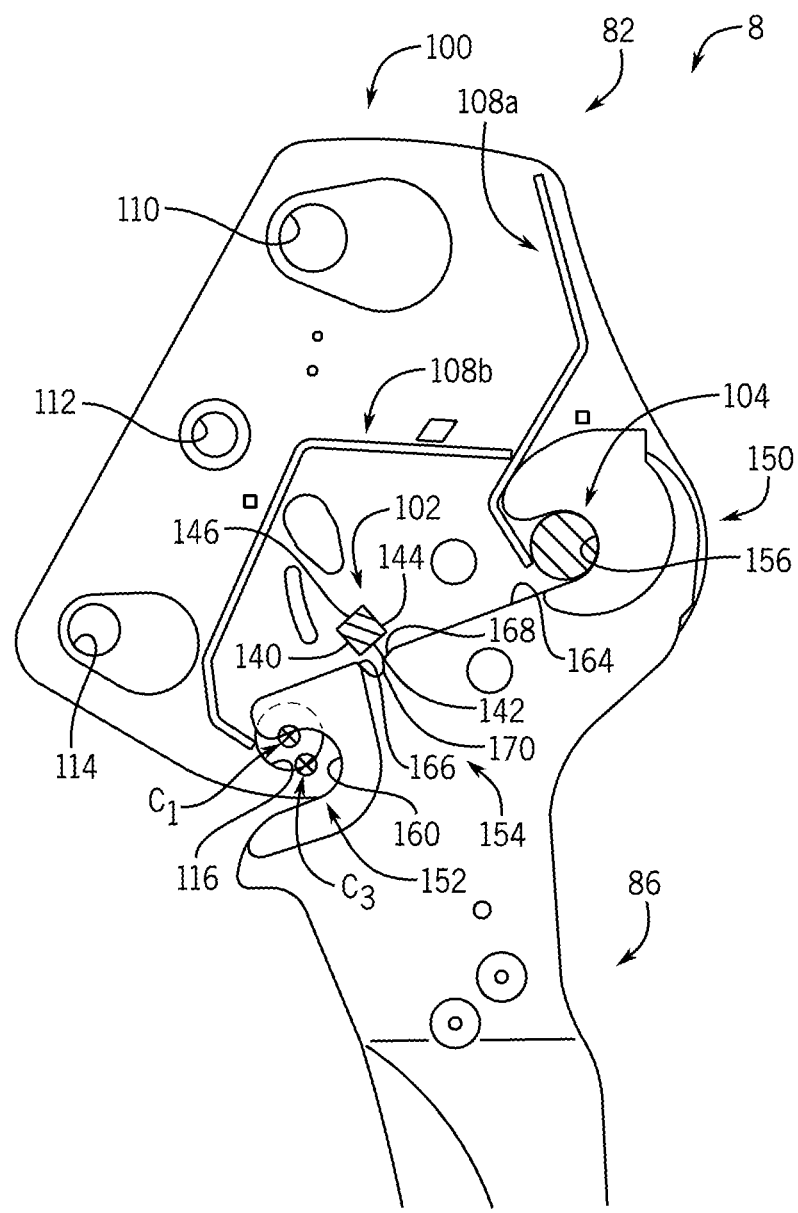
FIG. 5 is a cross-sectional detail view of the front loader mounting arrangement, taken along the perspective of line 3-3 of FIG. 2A, in which the tractor has been advanced toward the front loader such that a first mounting frame connection point of the mounting frame of the right side of the tractor is coupled to a first mast connection member of the mast of the right side of the front loader.

With reference to FIG. 5, the further advancement of the tractor 10 couples or hooks the first mast connection member 104 within the first mounting frame connection point 150. The coupling of the first mast connection member 104 to the first mounting frame connection point 150 along with gravity causes the mast 82 to rotate, such that the mast load element 102 is in proximity to the mounting frame load point 154.

Figure 6:
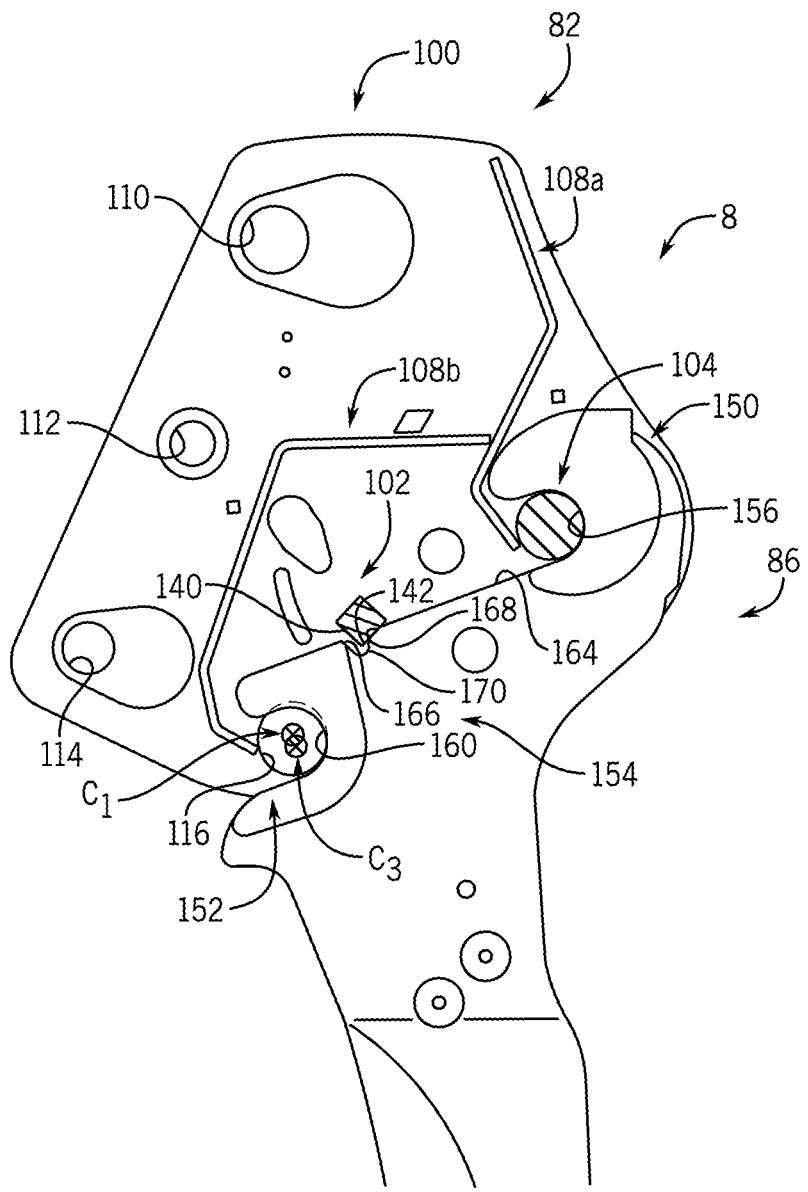
FIG. 6 is a cross-sectional detail view of the front loader mounting arrangement, taken along the perspective of line 3-3 of FIG. 2A, in which the tractor has been advanced toward the front loader such that a mounting frame load element of the mounting frame of the right side of the tractor is in contact with a second side of a mast load element of the mast of the right side of the front loader.

With reference to FIG. 6, as the mast 82 continues to rotate, the second side 142 of the mast load element 102 contacts the second surface 168 of the mounting frame load point 154. With contact between the second surface 168 of the mounting frame load point 154 and the second side 142 of the mast load element 102, the center axis C1 of the connection bore 116 is parallel to the center axis C3 of the second concave recess 160 such that a portion of the connection bore 116 is obscured by the second mounting frame connection point 152.

Figure 7:
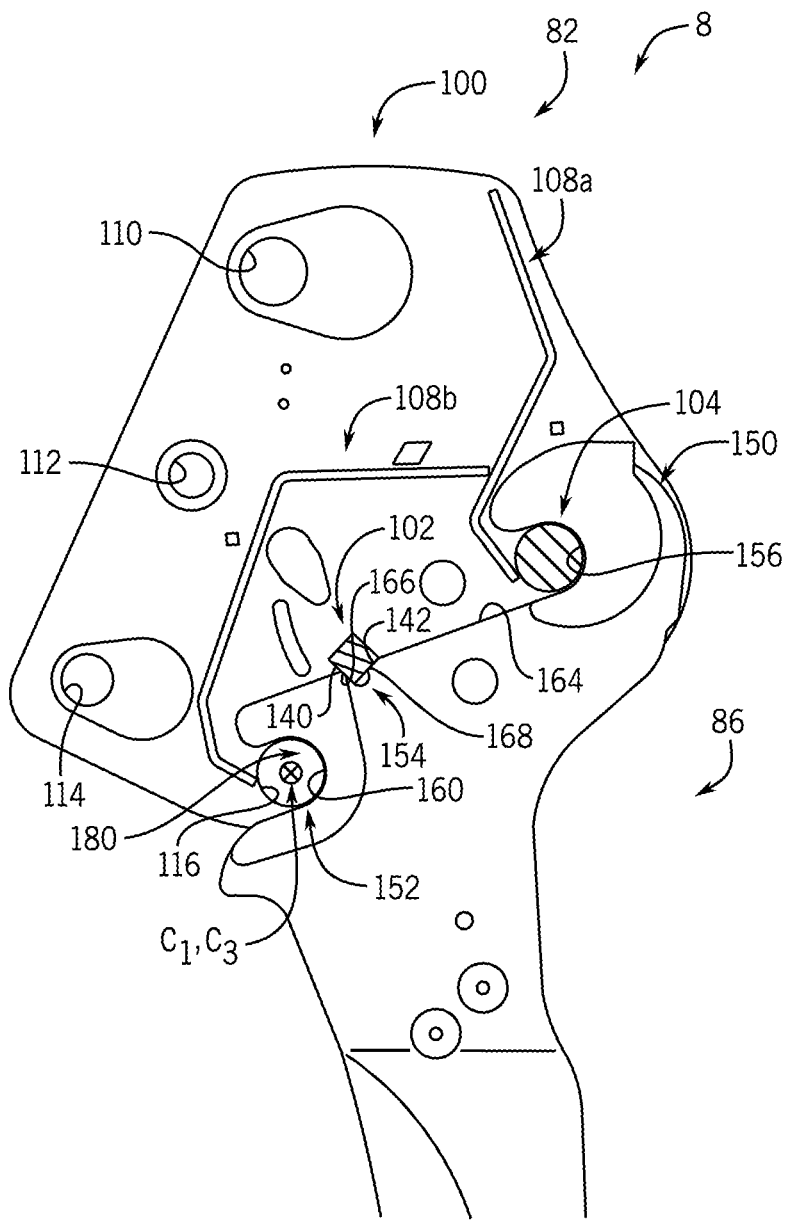
FIG. 7 is a cross-sectional detail view of the front loader mounting arrangement, taken along the perspective of line 3-3 of FIG. 2A, in which the tractor has been advanced toward the front loader such that the mounting frame load element of the mounting frame of the right side of the tractor is in contact with a first side and the second side of the mast load element to define a clearance.

Referring to FIG. 7, the mast 82 continues to rotate until the first side 140 of the mast load element 102 contacts the first surface 166 of the mounting frame load point 154. The contact between the first side 140 and the first surface 166, along with the contact between the second side 142 and the second surface 168, defines a clearance (generally indicated by reference numeral 180) between the second concave recess 160 and the connection bore 116 to enable the second mast connection member 88 to be received through the connection bores 116 and the second mounting frame connection point 152. Stated another way, as shown in FIG. 6, when there is only contact between the second surface 168 of the mounting frame load point 154 and the second side 142 of the mast load element 102, a portion of the mounting frame 86 obscures or blocks the insertion of the second mast connection member 88 through the connection bores 116. When there is contact between the first side 140 and the first surface 166; and between the second side 142 and the second surface 168, the clearance 180 is defined that enables the receipt or passage of the second mast connection member 88 through the connection bores 116 and the second mounting frame connection point 152. With the clearance 180 defined between the mounting frame 86 and the mast 82, the central axis C3 of the second concave recess 160 is also coaxially aligned with the central axis C1 of the connection bores 116. Thus, the contact between the first side 140 and the first surface 166; and the contact between the second side 142 and the second surface 168 defines a radial clearance that enables the second mast connection member 88 to be easily inserted through the connection bores 116 and the second concave recess 160.

Figure 8:
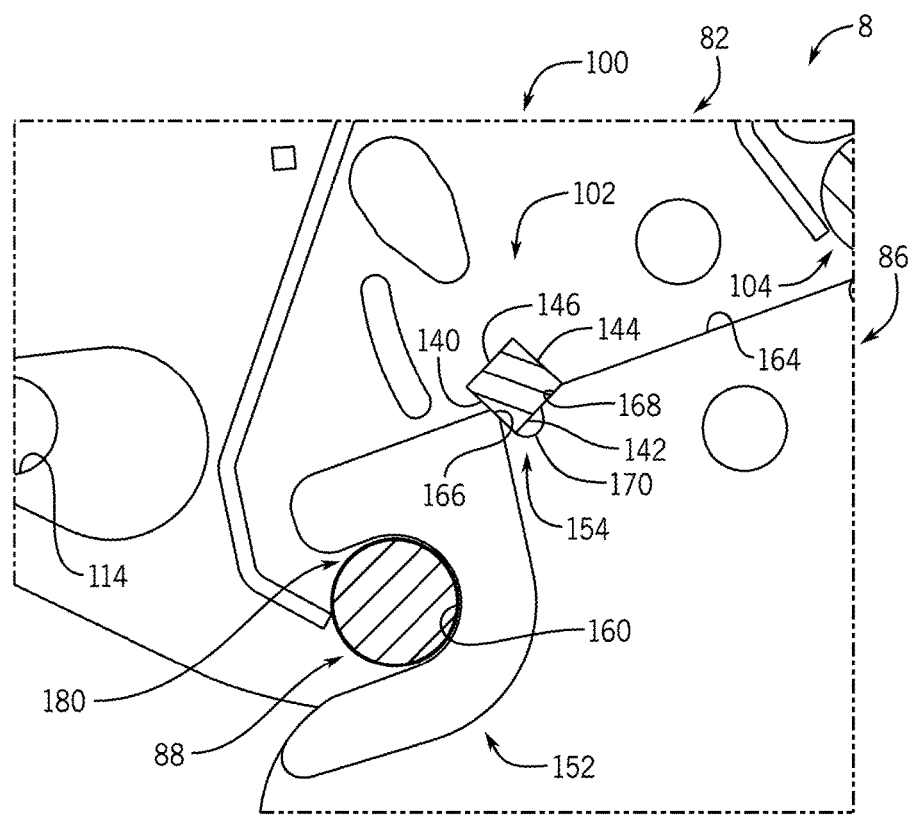
FIG. 8 is a cross-sectional detail view of the front loader mounting arrangement, taken along the perspective of line 3-3 of FIG. 2A, in which a removable second mast connection member is coupled to the mast and the mounting frame to couple the front loader to the tractor.

With reference to FIG. 8, with the clearance 180 defined between the mounting frame 86 and the mast 82 via the contact between the mounting frame load point 154 and the mast load element 102, the second mast connection member 88 is inserted into the second mounting frame connection point 152 by the operator to couple the front loader 12 to the tractor 10 (FIG. 1). With the mast 82 of the front loader 12 coupled to the mounting frame 86 of the tractor 10, the operator may also connect the hydraulic cylinders 34, 36, 38 of the front loader 12 to the hydraulic circuit of the tractor 10 and stow the parking stands 65 during the same trip from the cab 28 as inserting the second mast connection member 88. This improves cycle time and productivity of the tractor 10, and also improves operator satisfaction.

In order to disconnect the front loader 12 from the tractor 10, in one example, in one trip from the cab 28, the operator may disconnect the hydraulic cylinders 34, 36, 38 from the hydraulic circuit of the tractor 10, and may remove each of the second mast connection member 88. The second mast connection member 88 may be coupled to or secured to the front loader 12, or may be retained by the operator, in the cab 28, for example. The parking stands 65 may be positioned to support the front loader 12 on a ground surface. The operator returns to the cab 28 and retracts or moves the tractor 10 away from the front loader 12. The rearward movement of the tractor 10 causes the mast 82 to rotate relative to the mounting frame 86, such that the mast load element 102 no longer contacts the mounting frame load point 154. The continued rearward movement of the tractor 10 disengages or unhooks the first mast connection member 104 and the concave recess 156 of the first mounting frame connection point 150 to uncouple the front loader 12 from the tractor 10.

It will be understood that while the first mast connection member 104 is described and illustrated herein as being fixed between the pair of mounting brackets 100 and the second mast connection member 88 is described as being removable, it should be understood that in certain embodiments, the second mast connection member 88 may have opposed ends fixedly coupled between the pair of mounting brackets 100 and the first mast connection member 104 may be removable relative to the pair of mounting brackets 100. Moreover, while the first mast connection member 104 and the second mast connection member 88 are described and illustrated herein as comprising cylindrical pins, it will be understood that various other shaped elements may be employed for coupling the mast 82 to the mounting frame 86. Further, in certain embodiments, the front loader mounting arrangement 8 may include a single one of the first mast connection member 104 and the second mast connection member 88, if desired.

Also, the following examples are provided, which are numbered for easier reference:

1. A mast coupling arrangement for mounting a front loader to a work vehicle at a mounting frame defining connection points and a load point, the mast coupling arrangement comprising: a mounting bracket mounted at a proximal end of a mast of the front loader; a first mast connector removably coupling the mounting bracket and one of the connection points of the mounting frame when the front loader is attached to the work vehicle; a load element mounted to the mast and, when the front loader is attached to the work vehicle, being in load transferring contact with the load point of the mounting frame; and a second mast connector removably coupling the mounting bracket and another of the connection points of the mounting frame when the front loader is attached to the work vehicle; wherein the second mast connector and the associated connection point of the mounting frame are separable when the front loader is attached to the work vehicle.

2. The mast coupling arrangement of example 1, wherein the connections points of the mounting frame include a first connection point spaced apart from a second connection point.

3. The mast coupling arrangement of example 2, wherein the first mast connector is a first pin and the second mast connector is a second pin; and wherein the first and second connection points of the mounting frame are respective first and second open-sided recesses each sized to receive the respective first and second pins.

4. The mast coupling arrangement of example 3, wherein at least one of the first and second pins is removably coupled to the mounting bracket through at least one opening in the mounting bracket.

5. The mast coupling arrangement of example 4, wherein, when the front loader is attached to the work vehicle, the load element engages the load point of the mounting frame so that the at least one opening in the mounting bracket aligns with at least one of the first and second recesses of the mounting frame.

6. The mast coupling arrangement of example 5, wherein the first pin is fixed to the mounting bracket; and wherein the second pin is removably connected to the mounting bracket.

7. The mast coupling arrangement of example 6, wherein the load element is multi-sided bar and the load point of the mounting frame is a multi-sided notch having complementary sides configured to engage at least two sides of the bar in surface contact.

8. The mast coupling arrangement of example 7, wherein the notch is located on the mounting frame between the first and second recesses.

9. The mast coupling arrangement of example 1, wherein the mounting bracket includes a pair of bracket plates that cooperate to define a channel receiving the mounting frame when the front loader is attached to the work vehicle.

10. A method for coupling a front loader having a mast to a work vehicle having a mounting frame, the mounting frame including a first mounting frame connection point spaced apart from a second mounting frame connection point and a mounting frame load point between the first mounting frame connection point and the second mounting frame connection point, the method comprising: hooking the first mounting frame connection point on a first mast connector that extends from a mounting bracket mounted to the mast of the front loader; rotating the mast such that a mast load element contacts the mounting frame load point to align an opening in the bracket with the second mounting frame connection point; and inserting a removable second mast connector through the opening in the mounting bracket to engage the second mounting frame connection point of the mounting frame.

11. The method of example 10, wherein the hooking the first mounting frame connection point on the first mast connector further comprises: advancing the work vehicle toward the front loader to hook the first mounting frame connection point on the first mast connector.

12. The method of example 10, wherein the rotating the mast further comprises: rotating the mast such that a first side and a second side of the mast load element contact a first surface and a second surface of the mounting frame load point, the first side of the mast load element at an angle to the second side.

13. The method of example 10, wherein first mast connector is a fixed pin fixed to the mounting bracket; and wherein the first mounting frame connection point is a first open-sided recess sized to receive the fixed pin.

14. The method of example 10, wherein the second mast connector is a removable pin; and wherein the second mounting frame connection point is a second open-sided recess sized to receive the removable pin.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A mast coupling arrangement for mounting a front loader to a work vehicle at a mounting frame defining connection points and a load point, the mast coupling arrangement comprising:
   a mounting bracket mounted at a proximal end of a mast of the front loader;
   a first mast connector removably coupling the mounting bracket and one of the connection points of the mounting frame when the front loader is attached to the work vehicle;
   a load element mounted to the mast and, when the front loader is attached to the work vehicle, being in load transferring contact with the load point of the mounting frame; and
   a second mast connector removably coupling the mounting bracket and another of the connection points of the mounting frame when the front loader is attached to the work vehicle;
   wherein the first mast connector and the load element contact the mounting frame before the second mast connector when the front loader is attached to the work vehicle.

2. The mast coupling arrangement of claim 1, wherein the connections points of the mounting frame include a first connection point spaced apart from a second connection point.

3. The mast coupling arrangement of claim 2, wherein the first mast connector is a first pin and the second mast connector is a second pin; and
   wherein the first and second connection points of the mounting frame are respective first and second open-sided recesses each sized to receive the respective first and second pins.

4. The mast coupling arrangement of claim 3, wherein at least one of the first and second pins is removably coupled to the mounting bracket through at least one opening in the mounting bracket.

5. The mast coupling arrangement of claim 4, wherein, when the front loader is attached to the work vehicle, the load element engages the load point of the mounting frame so that the at least one opening in the mounting bracket aligns with at least one of the first and second recesses of the mounting frame.

6. The mast coupling arrangement of claim 5, wherein the first pin is fixed to the mounting bracket; and
   wherein the second pin is removably connected to the mounting bracket.

7. The mast coupling arrangement of claim 6, wherein the load element is a multi-sided bar and the load point of the mounting frame is a multi-sided notch having complementary sides configured to engage at least two sides of the bar in surface contact.

8. The mast coupling arrangement of claim 7, wherein the notch is located on the mounting frame between the first and second recesses.

9. The mast coupling arrangement of claim 1, wherein the mounting bracket includes a pair of bracket plates that cooperate to define a channel receiving the mounting frame when the front loader is attached to the work vehicle.

10. A work vehicle, comprising:
    a mounting frame having a load point and first and second connection points;
    a removable front loader having a mast; and
    a mast coupling arrangement, including:
       a mounting bracket mounted at a proximal end of the mast of the front loader;

a first mast connector removably coupling the mounting bracket and the first connection point of the mounting frame when the front loader is attached to the work vehicle;

a load element mounted to the mast and, when the front loader is attached to the work vehicle, being in load transferring contact with the load point of the mounting frame; and a second mast connector removably coupling the mounting bracket and the second connection point of the mounting frame when the front loader is attached to the work vehicle;

wherein the first mast connector and the load element contact the mounting frame before the second mast connector when the front loader is attached to the work vehicle.

11. The work vehicle of claim 10, wherein the first mast connector is a first pin and the second mast connector is a second pin; and wherein the first and second connection points of the mounting frame are respective first and second open-sided recesses each sized to receive the respective first and second pins.

12. The work vehicle of claim 11, wherein at least one of the first and second pins is removably coupled to the mounting bracket through at least one opening in the mounting bracket.

13. The work vehicle of claim 12, wherein, when the front loader is attached to the work vehicle, the load element engages the load point of the mounting frame so that the at least one opening in the mounting bracket aligns with at least one of the first and second recesses of the mounting frame.

14. The work vehicle of claim 13, wherein the first pin is fixed to the mounting bracket; and wherein the second pin is removably connected to the mounting bracket.

15. The work vehicle of claim 14, wherein the load element is a multi-sided bar and the load point of the mounting frame is a multi-sided notch located on the mounting frame between the first and second recesses and having complementary sides configured to engage at least two sides of the bar in surface contact.

16. A method for coupling a front loader having a mast to a work vehicle having a mounting frame, the mounting frame including a first mounting frame connection point spaced apart from a second mounting frame connection point and a mounting frame load point between the first mounting frame connection point and the second mounting frame connection point, the method comprising:

hooking the first mounting frame connection point on a first mast connector that extends from a mounting bracket mounted to the mast of the front loader;

rotating the mast such that a mast load element contacts the mounting frame load point to align an opening in the bracket with the second mounting frame connection point; and inserting a removable second mast connector through the opening in the mounting bracket to engage the second mounting frame connection point of the mounting frame after the first mounting frame connection point is hooked on the first mast connector and the mast load element contacts the mounting frame load point.

17. The method of claim 16, wherein the hooking the first mounting frame connection point on the first mast connector further comprises:

advancing the work vehicle toward the front loader to hook the first mounting frame connection point on the first mast connector.

18. The method of claim 16, wherein the rotating the mast further comprises:

rotating the mast such that a first side and a second side of the mast load element contact a first surface and a second surface of the mounting frame load point, the first side of the mast load element at an angle to the second side.

19. The method of claim 16, wherein first mast connector is a fixed pin fixed to the mounting bracket; and wherein the first mounting frame connection point is a first open-sided recess sized to receive the fixed pin.

20. The method of claim 16, wherein the second mast connector is a removable pin; and wherein the second mounting frame connection point is a second open-sided recess sized to receive the removable pin.

* * * * *

UNITED STATES PATENT AND TRADEMARK OFFICE
CERTIFICATE OF CORRECTION

PATENT NO. : 10,119,242 B1
APPLICATION NO. : 15/937092
DATED : November 6, 2018
INVENTOR(S) : Faivre et al.

Page 1 of 1

It is certified that error appears in the above-identified patent and that said Letters Patent is hereby corrected as shown below:

In the Claims

In Column 16, in Claim 2, Line 25, delete "connections" and insert -- connection --, therefor.

Signed and Sealed this
Twenty-sixth Day of February, 2019

Andrei Iancu
*Director of the United States Patent and Trademark Office*